United States Patent [19]

Iwamoto et al.

[11] Patent Number: 5,207,893
[45] Date of Patent: May 4, 1993

[54] HYDROCRACKING PROCESS EMPLOYING A NOVEL IRON-CONTAINING ALUMINOSILICATE

[75] Inventors: Ryuichiro Iwamoto; Satoshi Nakai, both of Sodegaura, Japan

[73] Assignee: Research Association for Residual Oil Processing, Tokyo, Japan

[21] Appl. No.: 833,709

[22] Filed: Feb. 11, 1992

Related U.S. Application Data

[62] Division of Ser. No. 468,102, Jan. 22, 1990, Pat. No. 5,141,737.

[30] Foreign Application Priority Data

Feb. 7, 1989 [JP] Japan ................................ 1-026770
Oct. 16, 1989 [JP] Japan ................................ 1-264843

[51] Int. Cl.$^5$ .................................................. C10G 47/02
[52] U.S. Cl. ...................................... 208/111; 502/66; 208/108; 208/110
[58] Field of Search ......................................... 208/111

[56] References Cited

U.S. PATENT DOCUMENTS

| | | | |
|---|---|---|---|
| 3,013,990 | 12/1961 | Breck et al. | 502/74 |
| 3,255,101 | 6/1966 | Arey, Jr. et al. | 208/111 |
| 3,506,400 | 4/1970 | Eberly, Jr. et al. | 502/78 |
| 3,691,099 | 9/1972 | Young | 502/73 |
| 3,860,333 | 1/1975 | Young | 502/74 |
| 4,207,208 | 6/1980 | Lucki et al. | 502/66 |
| 4,207,250 | 6/1980 | Butter et al. | 502/66 |
| 4,354,963 | 10/1982 | Butter et al. | 502/66 |
| 4,443,552 | 4/1984 | Iida et al. | 502/74 |
| 4,446,008 | 5/1984 | Shimakawa et al. | 208/111 |

FOREIGN PATENT DOCUMENTS

| | | | |
|---|---|---|---|
| 0140365 | 5/1985 | European Pat. Off. | |
| 59-121115 | 12/1982 | Japan | 423/328 |
| 58-34891 | 1/1983 | Japan | 423/328 |
| 63-301835 | 12/1988 | Japan | 423/328 |

*Primary Examiner*—Helane Myers
*Attorney, Agent, or Firm*—Frishauf, Holtz, Goodman & Woodward

[57] ABSTRACT

A process for hydrocracking heavy oil which comprises hydrocracking the heavy oil in the presence of a catalyst comprising a support of 10 to 90% by weight of an iron-containing aluminosilicate and 90 to 10% by weight of an inorganic oxide, and at least one metal belonging to Group VIB of the Periodic Table and at least one metal belonging to Group VIII deposited on the support. The iron-containing aluminosilicate has a composition of the formula expressed as oxides: $\cdot Al_2O_3 \cdot bSiO_2 \cdot nH_2O$ wherein n is a real number of 0 to 30, and a and b are real numbers satisfying the following relationships: $15 < b < 100$, $0.005 < a/b < 0.15$; and has an inert iron compound content, $(Fe)_{dep}$, as calculated by a temperature programmed reduction, of not more than 35% of the total iron content; and when subject to a temperature programmed reduction, Th (°C.), is within the following equation: $850°C. \leq Th \leq (-300 \times UD + 8,300)°C.$ wherein UD is a lattice constant (Å) of the iron-containing aluminosilicate.

15 Claims, 3 Drawing Sheets

HYDROCRACKING PROCESS EMPLOYING A NOVEL IRON-CONTAINING ALUMINOSILICATE

This application is a divisional of U.S. Ser. No. 07/468,102 filed Jan. 22, 1990 now U.S. Pat. No. 5,141,737.

BACKGROUND OF THE INVENTION

1. Field of the Invention

The present invention relates to a novel iron-containing aluminosilicate. More particularly, it relates to a novel aluminosilicate containing iron or an iron compound in its high activity condition, a process for efficiently producing the iron-containing aluminosilicate, and a process for hydrocracking heavy oil by the use of a catalyst containing the iron-containing aluminosilicate.

2. Description of the Related Arts

Aluminosilicates containing iron have heretofore been used as a catalyst for various reactions such as hydrocracking of heavy oil and disproportionation of toluene (e.g., Japanese Patent Application Laid-Open Nos. 2214/1983, 34891/1983, 47088/1983, 103588/1983 and 138788/1983).

It is known that in the preparation of iron-containing aluminosilicate as described above, a Y-type zeolite subjected to a steaming treatment as well as a Y-type zeolite is used as the starting material of the aluminosilicate. It is reported that in the hydrocracking of heavy oil, the Y-type zeolite subjected to a steaming treatment provides higher selectivity for yield of middle distillate than the Y-type zeolite does (e.g., Japanese Patent Application Laid-Open Nos. 103588/1983, 92026/1984, and 64914/1988).

However, an iron-containing steam treated aluminosilicate as described above is unsatisfactory in hydrocracking activity and, moreover, iron is not uniformly contained or deposited. Thus the aluminosilicate is not satisfactory in its practical use in respect of stability and activity.

One of the problems using a steam treated aluminosilicate as the starting material is that aluminum constituting the crystal skeleton partially drops off, consequently covering the surface of the crystal. An iron molecule in an iron salt solution takes various states depending on pH, temperature, concentration, coexisting elements, and so forth of the solution. Some active iron molecules for various reactions, therefore, tend to irreversibly change into a inactive state with a slight change in circumstances. It is believed that if an iron salt reacts with aluminum on the surface, inactive iron is liable to be deposited. Thus it is very difficult to an obtain aluminosilicate containing an iron in its high activity form in a stabilized manner.

In order to overcome the above problems, it was attempted to improve the state of iron contained or deposited by washing the surface through treatment with mineral acid after steaming. From this viewpoint, a method of preparing iron-containing aluminosilicate, comprising a combination of mineral acid treatment and iron salt treatment has been developed (Japanese Patent Application Laid-Open No. 121115/1984). In accordance with this preparation method, filtration, washing and calcination are conducted after treatment with mineral acid and, thereafter, iron salt treatment is applied. It has been found, however, that if filtration, washing and calcination are carried out after treatment with mineral acid, modification of the aluminosilicate surface occurs, leading to a change in the deposition state of iron and at the same time, the amount of iron deposited becomes unsatisfactorily low.

SUMMARY OF THE INVENTION

The present invention is intended to overcome problems of the above prior art. An object of the present invention is to provide an iron-containing aluminosilicate which has a stabilized performance and exhibits high catalytic activity.

It has been found that the above object can be attained by treating specified aluminosilicate subjected to a steaming treatment, with mineral acid and, thereafter, adding an iron salt to the same system and treating therein.

The present invention relates to a novel iron-containing aluminosilicate having:

a main composition (in the oxide form) as represented by the general formula:

$$aFe_2O_3 \cdot Al_2O_3 \cdot bSiO_2 \cdot nH_2O \qquad (I)$$

(wherein n is a real number of 0 to 30, and a and b are real numbers satisfying the following relation:

$$15 < b < 100,\ 0.005 < a/b < 0.15);$$

an inactive iron compound content $[Fe]_{dep}$ as calculated by a temperature programed reduction of not more than 35%; and at least one high-temperature reduction peak temperature, Th, falling within the range represented by the following range:

$$700°\ C. \leq Th \leq (-300 \times UD + 8320)°\ C. \qquad (I)$$

(wherein UD represents a lattice constant Å).

The present invention further relates to a process for producing the above iron-containing aluminosilicate which comprises contacting a steam treated aluminosilicate with mineral acid, said steam treated aluminosilicate being obtained by subjecting aluminosilicate with a silica to alumina (silica/alumina) molar ratio of at least 3.5 to a steaming treatment, and then contacting it with an iron salt in the presence of the mineral acid.

The present invention further relates to a process for the hydrocracking of heavy oil which comprises hydrocracking heavy oil in the presence of a catalyst comprising a support of 10 to 90% by weight of the above iron-containing aluminosilicate and 90 to 10% by weight of an inorganic oxide, and a metal belonging to Group VIB of the Periodic Table and a metal belonging to Group VIII as deposited on the support.

DESCRIPTION OF PREFERRED EMBODIMENTS

Figure 1:
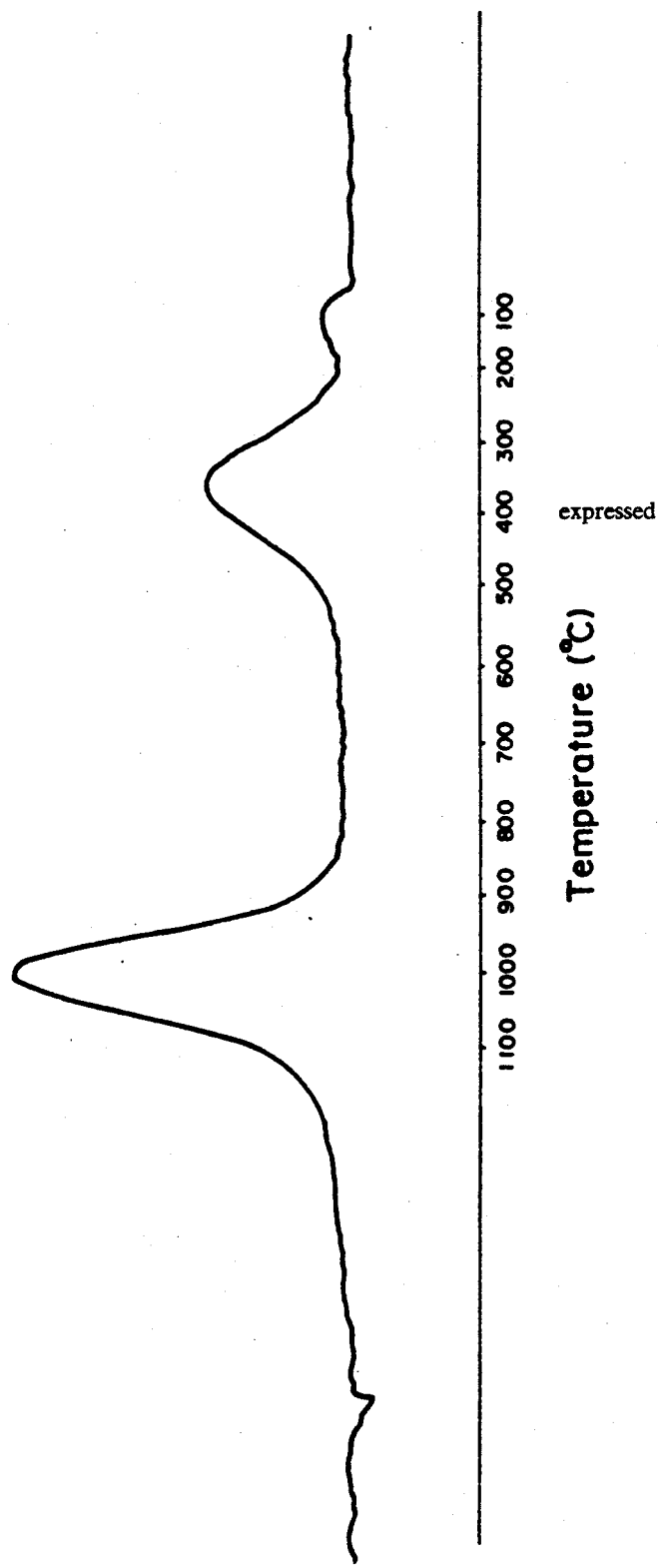
FIG. 1 is a TPR chart of FeSHY1 obtained in Example 1.

The main composition (in the oxide form) of the iron-containing aluminosilicate of the present invention is represented by the above general formula (I). In this general formula (I), n represents a real number of 0 to 30, b is such that $15<b<100$, preferably $18<b<40$, and a and b satisfy a relation of $0.005<a/b<0.15$, preferably $0.02<a/b<0.05$. The iron-containing aluminosilicate may contain a small amount of alkali metal oxide (e.g., $Na_2O$) or alkaline earth metal oxide, for example.

In general, in an iron-containing aluminosilicate, an iron compound is present in various forms as shown below.

(1) An inactive iron compound which is merely physically adsorbed or deposited on the surface of an aluminosilicate. This iron compound is reduced to a metal so as to be $Fe^{3+} \rightarrow Fe^0$ by one step at a temperature of not more than 500° C. in a hydrogen atmosphere.

(2) An iron compound which is regularly interacted with the framework of an aluminosilicate. Iron compounds in various forms, such as an ion exchanged iron compound, an iron compound constituting the framework of aluminosilicate, and a novel iron compound of the present invention are included. These iron compounds are reduced by two steps, $Fe^{3+} \rightarrow Fe^{2+}$ in a low temperature range (room temperature to 700° C.) and $Fe^{2+} \rightarrow Fe^0$ in a high temperature range (700° to 1,200° C.)

The iron compound as defined in (1) above can be judged by an inert iron compound content $[Fe]_{dep}$ as calculated by a temperature programed reduction (TPR) measurement. The compound as defined in (2) can be judged by the temperature of the reduction peak in the high temperature range in the TPR measurement.

In the iron-containing aluminosilicate of the present invention, $[Fe]_{dep}$ as calculated by the above TPR measurement is not more than 35% and preferably not more than 30%. At least one temperature of the high-temperature reduction peak temperatures, Th, is in such a range that $700°\,C. \leq Th \leq (-300 \times UD + 8,320)°\,C.$ and preferably $850°\,C. \leq Th \leq (-300 \times UD + 8300)°\,C.$ The TPR measurement as used herein refers to a measurement of amount of hydrogen consumed in increasing the temperature of a sample by heating in a stream of hydrogen. The state of the metal compound in the sample can be easily determined by the behavior of reduction with hydrogen.

In the TPR measurement of the iron-containing aluminosilicate of the present invention, a low-temperature reduction peak and a high-temperature reduction peak are observed. As the low-temperature reduction peak, a peak appearing at the reduction of $Fe^{3+}$ into $Fe^{2+}$ is observed in the range of room temperature to 700° C. As the high-temperature reduction peak, a peak appearing at the reduction of $Fe^{2+}$ into $Fe^0$ is observed in the range of 700° C. to $(-300 \times UD + 8,320)°$ C. In general, as the activity of the iron-containing aluminosilicate is higher, the high temperature range reduction peak tends to shift to a lower temperature. As the lattice constant of the zeolite is smaller, the temperature of the high-temperature reduction peak tends to be higher. In the iron-containing aluminosilicate of the present invention, if there are two or more high-temperature reduction peaks, at least one of the peaks is observed in the range of 700° C. to $(-300 \times UD + 8,320)°$ C.

The ratio of a reduction peak area in the high temperature range (high-temperature peak area, Sh) which is corresponding to the amount of hydrogen consumed in the high temperature range to a reduction peak area in the low temperature range (low-temperature peak area, Sl) which is corresponding to the amount of hydrogen consumed in the low temperature range, must be ideally 2 (Sh/Sl=2) stoichiometrically. However, if an inactive (impurity) iron compound is present, a peak appears only in the low temperature range and, therefore, the above ratio becomes smaller than 2. Thus the inactive iron compound content $[Fe]_{dep}$ can be defined by $$[Fe]_{dep} = \frac{Sl - Sh/2}{St} \times 100(\%)$$

wherein St indicates a total peak area. In the iron-containing aluminosilicate of the present invention, $[Fe]_{dep}$ is 35% or less, and preferably 30% or less.

The iron-containing aluminosilicate of the present invention possesses the aforementioned characteristics and its iron state is completely new as compared with the conventional ones. As the iron-containing aluminosilicate, various ones can be used as long as they satisfy the above requirements. In particular, Faujasite or Y type zeolite which is crystalline aluminosilicate is preferred. Faujasite or Y type zeolite having a lattice constant of 24.15 to 24.40 Å, especially 24.20 to 24.37 Å is most suitable.

The iron-containing aluminosilicate of the present invention is preferably produced by the aforementioned process of the present invention. In the process of the present invention, Faujasite type zeolite with a silica to alumina molar ratio, $SiO_2/Al_2O_3$, of at least 3.5/1, and preferably at least 4.6/1 is used as the starting material. If $SiO_2/Al_2O_3$ is less than 3.5, heat resistance is insufficiently low and crystallinity is liable to be broken. This aluminosilicate may contain about not more than 2.4% by weight of $Na_2O$. This $Na_2O$ content is preferably about not more than 1.8% by weight.

In accordance with the present invention, aluminosilicate as described above is subjected to a steaming treatment to produce a steam treated aluminosilicate. Conditions for this steaming treatment can be determined appropriately depending on various circumstances. In general, a steaming treatment is preferably carried out in the presence of steam maintained at a temperature of 540° to 810° C. A steaming treatment may be carried out by flowing steam, or the starting material of aluminosilicate may be placed in a sealed container and heated so as to cause self steaming by the action of water contained in the starting material.

In accordance with the process of the present invention, a steam treated aluminosilicate obtained by the above steaming treatment is then treated (contacted) with mineral acid. Although various mineral acids can be used, hydrochloric acid, nitric acid, sulfuric acid, etc. are generally used. In addition, phosphoric acid, perchloric acid, etc. can be used.

In accordance with the process of the present invention, the aforementioned mineral acid is added to steam treated aluminosilicate, or to a slurry prepared by adding water to steam treated aluminosilicate, and subsequently, the resulting system is treated (contacted) with an iron salt. This iron salt treatment may be carried out by adding an iron salt just after addition of the aforementioned mineral acid, or after addition of mineral acid and then sufficient stirring, the iron salt may be added. In addition, after addition of a predetermined amount of mineral acid, the remaining mineral acid and the iron salt may be added at the same time. In the process of the present invention, it is required that an iron salt is added to steam treated aluminosilicate to which mineral acid has been added, and in other words, the iron salt is added in the presence of the mineral acid.

Conditions for the above treatment by addition of mineral acid followed by addition of iron salt vary with various circumstances and cannot be determined unconditionally. Usually, the treating temperature is suitably chosen within the range of 5° to 100° C., preferably 50° to 90° C.; the treating time, within the range of 0.1 to 24 hours, preferably 0.5 to 5 hours; and the treating pH, within the range of 0.5 to 2.5, preferably 1.4 to 2.1. If the pH of the treating solution is more than 2.5, polymerized iron colloid is undesirably formed, and if the pH is less than 0.5, there is a danger of crystallinity of zeolite (aluminosilicate) being broken. The amount of mineral acid added is 5 to 20 mol per kilogram of aluminosilicate. The concentration of mineral acid is 0.5 to 50% by weight and preferably 1 to 20% by weight. As described above, mineral acid must be added before adding iron salt. The temperature at the time of addition of mineral acid is chosen within the aforementioned range, and preferably within a range of room temperature to 100° C. and particularly preferably within a range of 50° to 100° C.

The type of the iron salt to be added is not critical. Ferrous chloride, ferric chloride, ferrous nitrate, ferric nitrate, ferrous sulfate and ferric sulfate are usually used. Although the iron salt can be added as such, it is preferably added in the form of a solution. Any solvent capable of dissolving an iron salt can be used, and preferably, water, alcohol, ether, ketone, etc. are used. The concentration of the iron salt is usually 0.02 to 10.0M and preferably 0.05 to 5.0M. The iron salt should be added after adjusting the aluminosilicate slurry to pH 1 to 2 with the aforementioned mineral acid. The temperature at the time of addition of iron salt is preferably room temperature to 100° C. and preferably 50° to 100° C. It is also effective to heat the iron salt in advance, before addition thereof.

In the treatment of aluminosilicate with mineral acid and iron salt, the slurry ratio, i,e., volume of treating solution (liter)/weight of aluminosilicate (kg) is preferably within a range of 1/1 to 50/1 and particularly preferably in a range of 5/1 to 30/1.

The novel iron-containing aluminosilicate having properties as described above is obtained by carrying out mineral acid treatment and iron salt treatment, sequentially or simultaneously. If the aluminosilicate is dried and calcined after mineral acid treatment and then is subjected to iron salt treatment, iron-containing aluminosilicate having the desired properties cannot be obtained.

The iron-containing aluminosilicate as prepared above may be washed with water, dried and calcined, if necessary.

In the hydrocracking of heavy oil according to the process of the present invention, there is used a catalyst comprising a support containing the aforementioned novel iron-containing aluminosilicate and an inorganic oxide as main components and a metal belonging to Group VIB of the Periodic Table and a metal belonging to Group VIII as deposited on the support. The mixing ratio of iron-containing aluminosilicate to inorganic oxide is 10:90 to 90:10 (wt %) and preferably 30:70 to 70:30 (wt %). If the proportion of the iron-containing aluminosilicate is too small, the yield of the intermediate fraction drops. On the other hand, if the proportion is too high, the selectivity of the intermediate fraction drops and at the same time, the amount of hydrogen consumed increases.

The inorganic oxide constituting the support of the catalyst is a porous inorganic oxide used in the usual hydrocracking. As such inorganic oxides, water-containing oxides, for example, boehmite gel, alumina such as alumina sol, silica such as silica sol, and silica-alumina are used. As components to be deposited on the support, at least one metal belonging to Group VIB and at least one metal belonging to Group VIII are used. These metal components should be used in combination with each other. When only one of the components is used, the objects of the present invention cannot be achieved sufficiently. Preferred examples of the metals belonging to Group VIB are tungsten and molybdenum, and preferred examples of the metal belonging to Group VIII are nickel and cobalt. Although one metal belonging to Group VIB and one metal belonging to Group VIII may be used, a mixture of a plurality of Group VIB metals and a plurality of Group VIII may be used.

The amount of Group VIB metal or Group VIII metal deposited as an active component is not critical and can be chosen appropriately depending on various conditions. The amount of Group VIB metal deposited is usually 0.5 to 24% by weight, preferably 8 to 20% by weight based on the total weight of the catalyst. The amount of Group VIII deposited is usually 0.5 to 20% by weight and preferably 1.5 to 8% by weight based on the total weight of the catalyst.

The above active components can be deposited on the support by known methods such as a coprecipitation method, an impregnation method and a kneading method.

In accordance with the process of hydrocracking of the present invention, heavy oil is hydrocracked by the use of the aforementioned catalyst singly or in combination with a conventional hydrotreating catalyst. The heavy oil to be hydrocracked is not critical in type; various types of heavy oils can be used. In general, atmospheric residual oil, vacuum residual oil, heavy gas oil, vacuum gas oil and clarified oil, visbraking oil, tar sand oil, hydrocarbon oils derived from shale oil, and the like can be used.

In hydrocracking of heavy oil according to the process of the present invention, a wide variety of reaction conditions conventionally employed in hydrocracking can be employed. Specific reaction conditions vary with the type of the feed oil and so on, and cannot be determined unconditionally. Usually the reaction temperature is chosen within the range of 370° to 650° C., the reaction pressure, within the range of 10 to 300 kg/cm$^2$, the liquid hourly space velocity (LHSV), within the range of 0.1 to 1 hr$^{-1}$, and H$_2$/oil, within the range of 500 to 5000 Nm$^3$/liter.

The present invention provides iron-containing aluminosilicate in which iron or an iron compound is contained in the aluminosilicate in a completely new form and furthermore uniformly, and which is stable and of extremely high catalytic activity.

This iron-containing aluminosilicate can be effectively used as a catalyst or support for hydrocracking, hydroforming, disproportionation and so on of various hydrocarbons, and furthermore in various fields, for example, as an absorbent.

The process for hydrocracking of heavy oil of the present invention is a greatly useful method in practical use because not only the rate of cracking of heavy oil is high as compared with the conventional methods but also the yield of the middle distillate is high. Accordingly the process is expected to be effectively utilized in the filed of oil refinery.

The present invention is described in greater detail with reference to the following examples. (A) Preparation of Iron-Containing Steam treated Zeolite

EXAMPLE 1

200 g of Y-type Zeolite having a $Na_2O$ content of 0.4% by weight and a $SiO_2/Al_2O_3$ molar ratio of 5.0/1 was placed in a rotary kiln and was subjected to self steaming treatment at 680° C. for 3 hours. The decrease in weight at this time was about 20% by weight. Then, 80 g of this steam treated Zeolite (hereinafter referred to as "SHY Zeolite") was mixed with 2,400 g of a 3.5% by weight aqueous solution of nitric acid, and heated to 75° C.

The above mixture was mixed with 140 g of a 1.0M aqueous $Fe(NO_3)_3$ solution and stirred at 75° C. for 2 hours.

The resulting mixture was filtered by suction and thoroughly washed with ion exchanged water, and then dried at 120° C. to obtain iron-containing steaming Zeolite (hereinafter referred to as "FeSHY1").

EXAMPLE 2

Iron-containing steaming Zeolite was obtained in the same manner as in Example 1 except that the steam treated temperature was changed to 700° C. This Zeolite is referred to as "FeSHY2".

EXAMPLE 3

Iron-containing steam treated Zeolite was obtained in the same manner as in Example 1 except that the concentration of the aqueous nitric acid solution was changed to 3.0% by weight. This Zeolite is referred to as "FeSHY3".

EXAMPLE 4

Iron-containing steam treated Zeolite was obtained in the same manner as in Example 2 except that the concentration of the aqueous nitric acid solution was changed to 4.5% by weight. This Zeolite is referred to as "FeSHY4".

EXAMPLE 5

Iron-containing steam treated Zeolite was obtained in the same manner as in Example 2 except that the concentration of the aqueous nitric acid solution was changed to 5.0% by weight. This Zeolite is referred to as "FeSHY5".

Comparative Example 1

100 g of SHY Zeolite obtained in the same manner as in Example 1 and 1,000 cc of a 0.2N aqueous hydrochloric acid solution were placed in a vessel equipped with a stirrer, stirred under reflux at 90° C. for 2 hours, filtered and washed with water, dried at 90° C. for 4 hours, and then calcined in an electric furnace at 500° C. for 3 hours to obtain hydrochloric acid-treated Zeolite. Subsequently, 80 g of the hydrochloric acid-treated Zeolite and 640 g of a 0.25M aqueous solution of $Fe(NO_3)_3$ were placed in a vessel equipped with a stirrer and stirred under reflux at 50° C. for 2 hours. Then it was filtered and washed with ion exchanged water, dried at 50° C. for 4 hours, and calcined in an electric furnace at 500° C. for 3 hours to obtain iron containing steam treated Zeolite (hereinafter referred to as "FeSHY6").

Comparative Example 2

100 g of SHY Zeolite as obtained in the same manner as in Example 1 was mixed with 3,000 g of a 4.0% by weight aqueous solution of nitric acid, and then heated to 75° C. Subsequently, the mixture was filtered, washed with water, dried at 90° C. for 4 hours, and then calcined in an electric furnace at 500° C. for 3 hours to obtain nitric acid-treated Zeolite. Then, 80 g of the nitric acid-treated Zeolite was mixed with 140 g of a 1.0M aqueous solution of $Fe(NO_3)_3$ and stirred under reflux at 50° C. for 2 hours.

The Zeolite was filtered, washed with ion exchanged water and then dried at 120° C. to obtain iron-containing steam treated Zeolite (hereinafter referred to as "FeSHY7").

Comparative Example 3

Iron-containing steam treated Zeolite was obtained in the same manner as in Comparative Example 2 except that the concentration of the aqueous nitric acid solution to be added was changed to 5.0% by weight. This Zeolite is referred to as "FeSHY8".

Comparative Example 4

80 g of SHY Zeolite obtained in the same manner as in Example 1 was mixed with 640 cc of a 0.25M aqueous solution of $Fe(NO_3)_3$ and then stirred under reflux at 50° C. This zeolite was filtered, washed with ion exchanged water, dried at 50° C. for 4 hours, and then calcined in an electric furnace at 500° C. for 3 hours to obtain iron-containing steam treated Zeolite (hereinafter referred to as "FeSHY9").

(B) TPR Measurement

About 100 mg of each FeSHY obtained in (A) above was charged in a quartz glass tube and calcined at 650K for 2 hours in a stream of dry air.

After cooling to room temperature, the glass tube was kept in a stream of hydrogen-argon mixed gas for several hours. It was then raised in temperature to 1077° C. at a temperature-increasing rate of 10° C./min, and during this period, the material balance of hydrogen was measured. The hydrogen content of the remaining mixture was monitored continuously by means of a thermal conductivity detector (TCD).

Figure 2:
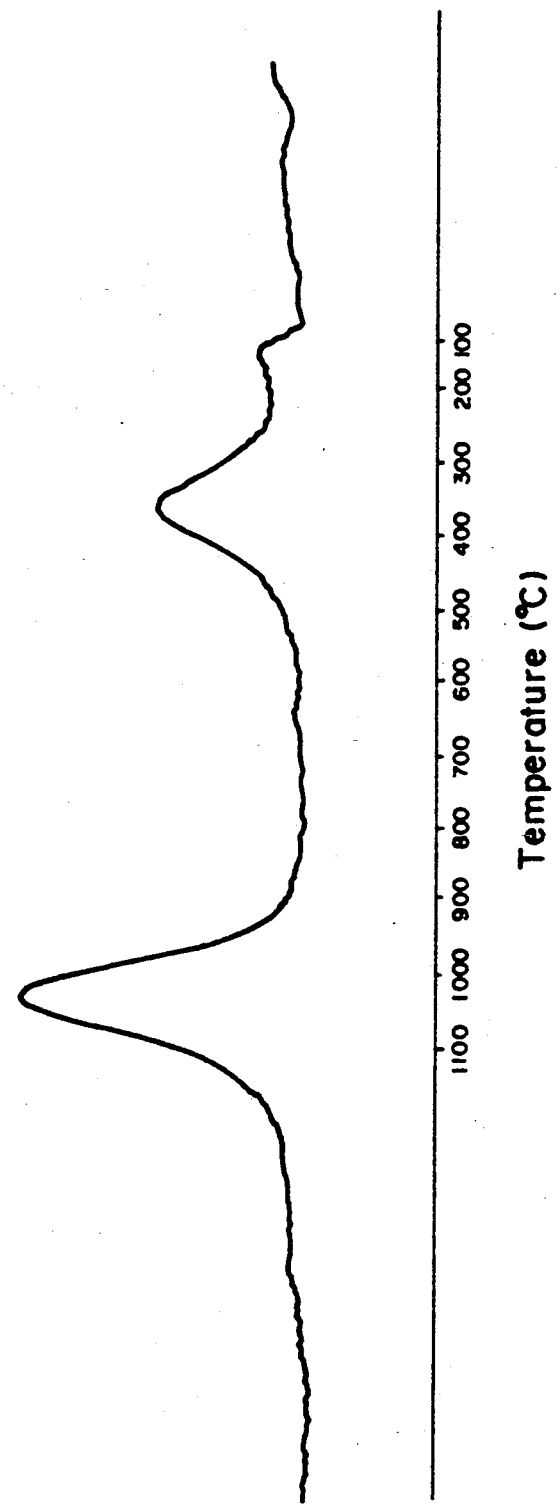
FIG. 2 is a TPR chart of FeSHY6 obtained in Comparative Example 1.
Figure 3:
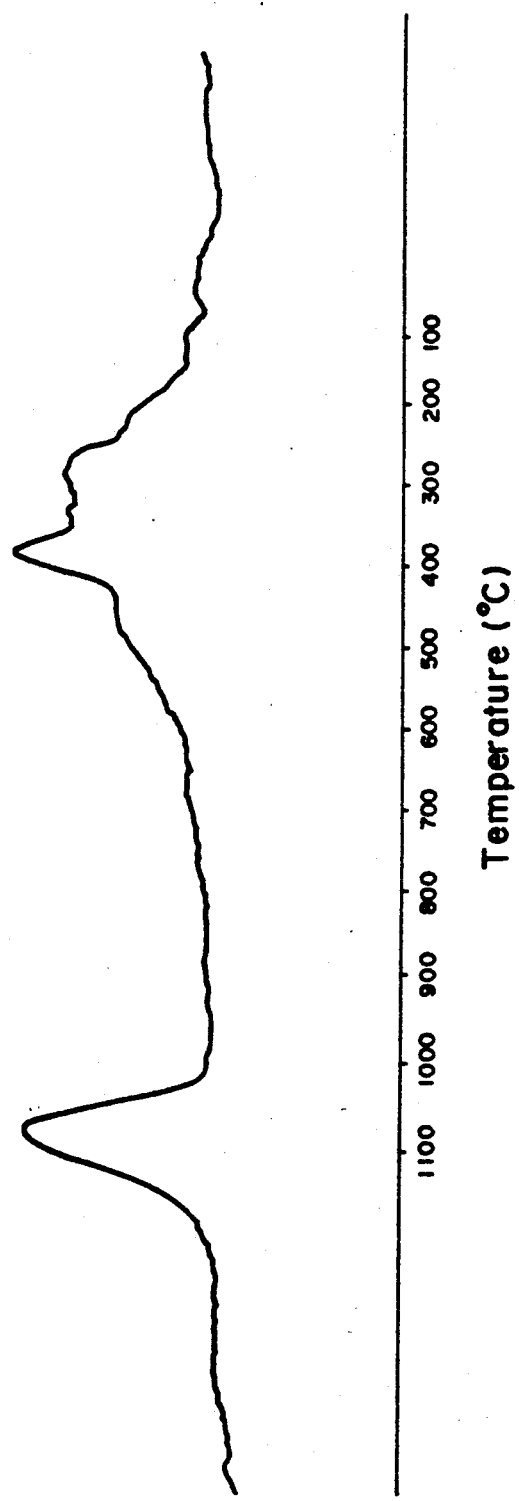
FIG. 3 is a TPR chart of FeSHY9 obtained in Comparative Example 4.

$[Fe]_{dep}$ and temperature of the higher temperature range reduction peak as obtained are shown in Table 1. TPR charts of Example 1 and Comparative Examples 1 and 4 are shown in FIGS. 1, 2 and 3, respectively.

(C) Measurement of Lattice Constant (UD)

Each FeSHY obtained in (A) above and the internal standard of silicon powder were thoroughly mixed, pulverized and charged in a sample holder for X-ray diffraction analysis. Measurement was carried out according to step scanning method using a Cu tube at an applied voltage of 40 kv and an applied current of 40 mV. The lattice constant (UD) of FeSHY was calculated from the angle of peaks obtained. The results are shown in Table 1.

TABLE 1

| Properties of Aluminosilicate obtained | Example | | | | | Comparative Example | | | |
|---|---|---|---|---|---|---|---|---|---|
| | FeSHY1 | FeSHY2 | FeSHY3 | FeSHY4 | FeSHY5 | FeSHY6 | FeSHY7 | FeSHY8 | FeSHY9 |
| $Fe_2O_3/SiO_2$ (molar ratio) | 0.031 | 0.035 | 0.050 | 0.016 | 0.012 | 0.026 | 0.011 | 0.008 | 0.08 |
| $SiO_2/Al_2O_3$ (molar ratio) | 22.3 | 25.3 | 18.2 | 52.3 | 68.4 | 17.6 | 45.4 | 73.6 | 10.5 |
| Lattice Constance (Å) | 24.32 | 24.37 | 24.35 | 24.27 | 24.18 | 24.35 | 24.29 | 24.22 | 24.36 |
| TPR | | | | | | | | | |
| $[Fe]_{dep}$ (%) | 1.0 | 7.3 | 6.0 | 2.3 | 1.0 | 3.5 | 2.0 | 1.0 | 49.0 |
| Higher Temperature Range Peak Temperature Th (°C) | 996 | 1004 | 958 | 1030 | 1060 | 1022 | 1043 | 1062 | 1074 |

(D) Preparation of Catalyst 67 g of each of FeSHYs obtained in Example 1, Comparative Examples 1 and 4 in (A) above was mixed with 189 g of Boehmite gel and 50 cc of ion exchanged water, kneaded and, after adjustment to a water content suitable for wet extrusion molding, molded into a form with a diameter of 1 mm and a length of 3 mm under a molding pressure of 30 kg/cm². Subsequently, it was dried at 120° C. for 3 hours and calcined at 500° C. for 3 hours to obtain an FeSHY-$Al_2O_3$ support having an FeSHY content of 65% by weight.

Then, 75 g of the support obtained above was impregnated with 45 ml of an aqueous solution containing 13.6 g of $Co(NO_3)_2 \cdot 6H_2O$ and 74.8 g of $(NH_4)_6Mo_7O_{24} \cdot 4H_2O$ under vacuum, the support was dried at 90° C. for 3 hours to control the metal oxide contents, CoO 4% by weight and $MoO_3$ 10% by weight based on the total weight of the catalyst. Subsequently, it was calcined at 500° C. for 5 hours to obtain pellets of the respective catalyst.

(E) Hydrocracking of Heavy Oil 100 cc of the catalyst pellets obtained in (D) above were charged in a high pressure fixed bed reactor and, after sulfurization, an atmospheric residue of Kuwait oil was hydrocracked under conditions of liquid hourly space velocity (LHSV) of 0.3 hr$^{-1}$, hydrogen partial pressure of 135 kg/cm² and hydrogen/oil ratio of 2,000 Nm³/liter.

The conversion of 343+° C. fraction to the lighter ones and a yield of a middle distillate (171° to 343° C.) after 400 hours were measured, and the results are shown in Table 2.

TABLE 2

| | Example 1 | Comparative Example 1 | Comparative Example 4 |
|---|---|---|---|
| 343+° C. Conversion | 66 | 50 | 44 |
| Yield of Middle Distillate* | 33 | 30 | 29 |

*Hydrocarbon having a boiling point of 171 to 343° C. (proportion in the product)

What is claimed is:

1. A process for hydrocracking heavy oil which comprises hydrocracking the heavy oil in the presence of a catalyst comprising a support of 10 to 90% by weight of an iron-containing aluminosilicate and 90 to 10% by weight of an inorganic oxide, and at least one metal belonging to Group VIB of the Periodic Table and at least one metal belonging to Group VIII deposited on the support, said iron-containing aluminosilicate having a composition of the formula expressed as oxides:

$$aFe_2O_3 \cdot Al_2O_3 \cdot bSiO_2 \cdot nH_2O$$

wherein n is a real number of 0 to 30, and a and b are real numbers satisfying the following relationships:

$$15 < b < 100, \ 0.005 < a/b < 0.15;$$

having an inert iron compound content, $(Fe)_{dep}$, as calculated by a temperature programmed reduction, of not more than 35% of the total iron content; and when subject to a temperature programmed reduction, at least one temperature of a high-temperature reduction peak, Th (°C.), within the following equation:

$$700° \text{ C.} \leq Th \leq (-300 \times UD + 8{,}320)°\text{C.}$$

wherein UD is a lattice constant (Å) of the iron-containing aluminosilicate, and said iron-containing aluminosilicate is prepared by
  (a) steam treating an aluminosilicate having a silica to alumina molar ratio of at least 3.5/1 to obtain a steam treated aluminosilicate,
  (b) contacting the steam treated aluminosilicate with a mineral acid, and
  (c) then contacting the steam treated aluminosilicate with an iron salt in the presence of said mineral acid without washing, drying or calcining after step (b).

2. The process according to claim 1 wherein the inorganic oxide is selected from boehmite, alumina, silica and silica-alumina.

3. The process according to claim 1 wherein the metal belonging to Group VIB is tungsten or molybdenum.

4. The process according to claim 1 wherein the metal belonging to Group VIII is nickel or cobalt.

5. The process according to claim 1 wherein the catalyst comprises a support of 30 to 70% by weight of said iron-containing aluminosilicate and 70 to 30% by weight of an inorganic oxide.

6. The process of claim 1 wherein
  the inorganic oxide is selected from boehmite, alumina, silica and silica-alumina;
  the metal belonging to Group VIB is tungsten or molybdenum; and
  the metal belonging to Group VIII is nickel or cobalt.

7. The process of claim 5 wherein
  the inorganic oxide is selected from boehmite, alumina, silica and silica-alumina;
  the metal belonging to Group VIB is tungsten or molybdenum; and
  the metal belonging to Group VIII is nickel or cobalt.

8. The process according to claim 1 wherein said iron-containing aluminosilicate further contains an alkali metal oxide or an alkaline earth metal.

9. The process according to claim 6 wherein said iron-containing aluminosilicate further contains $Na_2O$ in an amount of not more than 1.8 wt. %.

10. The process according to claim 1 wherein said iron-containing aluminosilicate comprises a faujasite zeolite.

11. The process according to claim 10 wherein the silica to alumina molar ratio is at least 4.6/1.

12. The process according to claim 6 wherein said iron-containing aluminosilicate is a Y zeolite.

13. The process according to claim 9 wherein said iron-containing aluminosilicate is a Y zeolite.

14. The process according to claim 11 wherein said iron-containing aluminosilicate is a Y zeolite.

15. The process according to claim 10, wherein said faujasite zeolite is zeolite Y.

* * * * *